United States Patent
Block et al.

(10) Patent No.: US 7,349,717 B2
(45) Date of Patent: Mar. 25, 2008

(54) FRONT-END CIRCUIT FOR WIRELESS TRANSMISSION SYSTEMS

(75) Inventors: Christian Block, Stainz (AT); Enrico Leitschak, Munich (DE); Arne Eckau, Munich (DE); Holger Fluehr, Graz (AT); Kurt Wiesbauer, Kalsdorf (AT); Peter Hagn, Finsing (DE); Edgar Schmidhammer, Stein (DE)

(73) Assignee: Epcos AG, Munich (DE)

( * ) Notice: Subject to any disclaimer, the term of this patent is extended or adjusted under 35 U.S.C. 154(b) by 52 days.

(21) Appl. No.: 10/552,926

(22) PCT Filed: Feb. 2, 2004

(86) PCT No.: PCT/EP2004/000933

§ 371 (c)(1),
(2), (4) Date: Mar. 27, 2006

(87) PCT Pub. No.: WO2004/091109

PCT Pub. Date: Oct. 21, 2004

(65) Prior Publication Data

US 2006/0194550 A1    Aug. 31, 2006

(30) Foreign Application Priority Data

Apr. 11, 2003    (DE) ................. 103 16 719

(51) Int. Cl.
*H04M 1/00*    (2006.01)
*H04B 1/44*    (2006.01)

(52) U.S. Cl. .................. 455/552.1; 455/78
(58) Field of Classification Search ............ 455/552.1, 455/553.1, 73, 78, 79, 80, 82, 269
See application file for complete search history.

(56) References Cited

U.S. PATENT DOCUMENTS 4,980,660 A * 12/1990 Nakamura et al. .......... 333/101
6,014,551 A *  1/2000 Pesola et al. ................. 455/86

(Continued)

FOREIGN PATENT DOCUMENTS

DE          10029419          12/2001

(Continued)

*Primary Examiner*—Quochien B. Vuong
(74) *Attorney, Agent, or Firm*—Fish & Richardson P.C.

(57) ABSTRACT

A functional block of a front-end circuit for a communication device, which is employed for multi-band and/or multi-mode operation, is proposed. By positioning, according to this invention, a pin diode switch in one of the parallel signal paths instead of positioning it on the input side before separating the signal paths, it is possible to do without an impedance transformation network on the input side and to thus reduce the signal loss and the space requirement of the circuit. In a further configuration, the signal paths preferably associated with the adjacent frequency bands are combined on the output side, whereby the further processing of the signals corresponding to the different frequency bands takes place in one path. This for example allows a chip set designed for (n−1) frequency bands to be used in a transmission system designed for n bands. Another embodiment of this invention enables monitoring of the received signal of a system even during operation of the other mode in a multi-mode system. Stable electrical properties of the circuit can be achieved according to this invention through integration of all components of the front-end circuit in one module.

30 Claims, 10 Drawing Sheets

U.S. PATENT DOCUMENTS

| | | |
|---|---|---|
| 6,249,670 B1 | 6/2001 | Kunkel et al. |
| 6,298,224 B1 * | 10/2001 | Peckham et al. ........ 455/188.1 |
| 6,466,768 B1 | 10/2002 | Agahi-Kesheh et al. |
| 6,798,294 B2 * | 9/2004 | Kuiri .......................... 330/295 |
| 6,845,231 B2 * | 1/2005 | Frank .......................... 455/88 |
| 7,155,184 B2 * | 12/2006 | Kim .......................... 455/205 |
| 2002/0049075 A1 * | 4/2002 | Takagi ....................... 455/553 |
| 2002/0090974 A1 * | 7/2002 | Hagn ......................... 455/552 |
| 2003/0199271 A1 * | 10/2003 | Watanabe et al. ........... 455/424 |

FOREIGN PATENT DOCUMENTS

| | | |
|---|---|---|
| DE | 10054968 | 8/2002 |
| EP | 0 959 567 | 11/1999 |

* cited by examiner

FIG 6   Stand der Technik
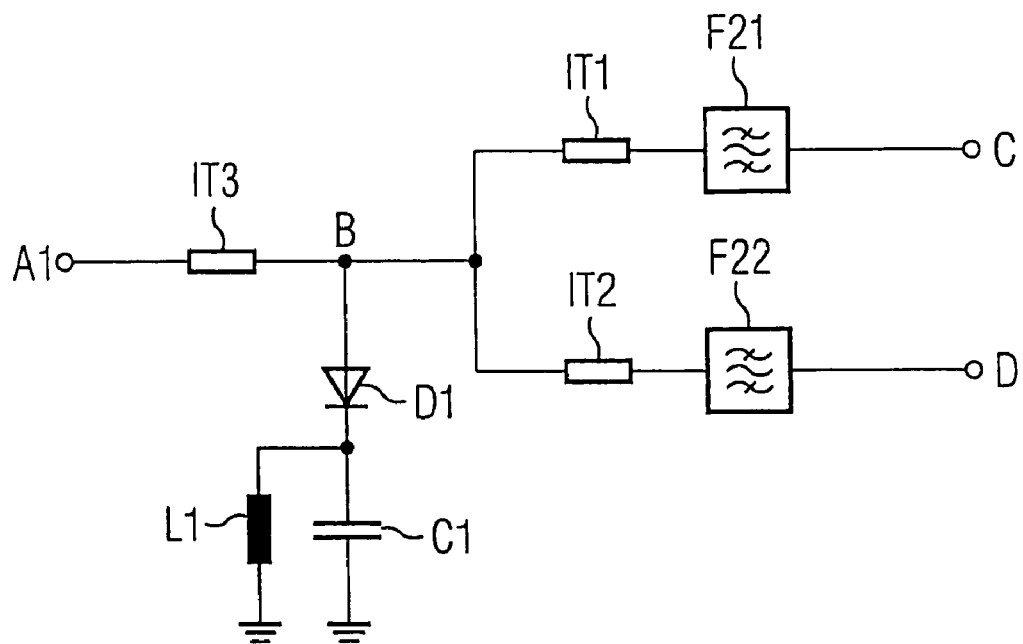
FIG 7
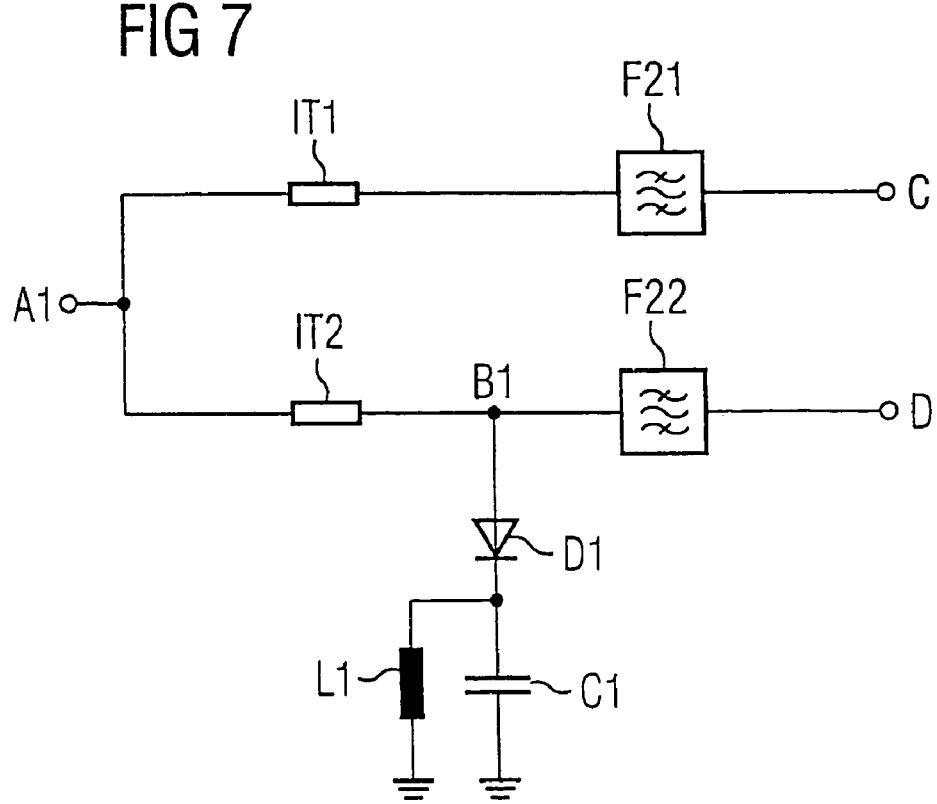

US 7,349,717 B2

FRONT-END CIRCUIT FOR WIRELESS TRANSMISSION SYSTEMS

TECHNICAL FIELD

This application describes a front-end circuit for wireless transmission systems, which can comprise several frequency bands of a mobile radio system or can serve several mobile radio systems.

BACKGROUND

Simple mobile radio devices (cell-phones) serve only one standard (one frequency band of a mobile radio system) and they are therefore only unrestrictedly operable in regions wherein sufficient net coverage for this standard is available. Multi-band mobile radio devices covering several frequency bands (of a mobile radio system) are suitable, for purposes of better accessibility, in regions with incomplete net coverage and/or for increasing the capacity in areas with many users. So-called dual band and triple band cell-phones function by means of the same transmission process (for example GSM), but they can transmit and receive in different frequency bands and are therefore equipped for several standards, for example simultaneously for GSM1800 (DCS, Digital Cellular System, 1800 MHz) and GSM900 (EGSM, 900 MHz) or even additionally for GSM1900 (PCS, Personal Communication System, 1900 MHz) and/or GSM850 (850 MHz).

At present, communication devices with a multi-mode transmission system are also being developed, which devices are suitable for operating in several mobile radio systems of the same generation or of different generations (e.g., GSM combined with UMTS), in that a switch is provided on the input side and/or the antenna side, which switch alternatively connects an antenna with the signal paths associated with different mobile radio systems. In heretofore known communication devices with a multi-mode transmission system, which are also applicable for operation via the UMTS transmission process, which implies continuous wave signal transmission, the UMTS components, in particular band pass filters for 2000 MHz, are usually designed on the basis of ceramic microwave elements. These are connected behind a front-end circuit, so that the corresponding interface constitutes a potential source for impedance matching problems and therefore also for signal losses, since, e.g., the length of the signal paths are not fixed.

A front-end circuit is understood to be the antenna-side part of a communication device, which connects the shared antenna with the filters and the latter with the possibly different signal processing paths for different operating modes and access processes, in particular the LNA (low noise amplifier) for the reception path or the PA (power amplifier) for the transmission path, and which furthermore includes the switches necessary for switching between the access and the operating processes.

Numerous existing wireless transmission systems, in particular mobile radio systems, can differ both in terms of the transmission standard and in terms of the frequency bands being employed (multi-mode/multi-band systems). This makes use of various access methods (multiplexing methods) for the transmission of different data in a communication channel, for example CDMA (Code Division Multiple Access), WCDMA (Wideband CDMA), TDMA (Time Division Multiple Access) or FDMA (Frequency Division Multiple Access). Combinations of access methods, e.g. TD-CDMA (Time Division Code Division Multiple Access) in the transmission of UMTS data, are also known.

These different access methods can additionally comprise different duplexing methods, in order to separate the transmitted and the received data and to enable a simultaneous transmit and receive operation in the communication device. Known duplexing processes are FDD (Frequency Division Duplexing) and TDD (Time Division Duplexing). Some standards also use a duplexing processes with a mixed FDD/TDD operation, in which different frequency bands are provided for the transmit and receive operations, but in which the transmitted and received signals are additionally temporally separated from each other and are transmitted or received in so-called different time slots.

In the case of known multi-band mobile radio device standards with a mixed FDD/TDD duplexing operation, access to a shared antenna for transmitting (TX) and receiving (RX) is usually achieved via an HF switch. A transmission system then uses a pair of (frequency) bands, in which the frequencies are designated for transmitting and receiving. If the band pair of a system is sufficiently far away from other bands (other systems) (typically about 1 octave), the filters and the signal processing paths for this band pair can be interconnected in an impedance neutral manner (e.g., through a diplexer) which is separate from the remaining ones and they can be connected with the shared antenna. The use of a diplexer is generally applicable for selecting the frequency band and/or pre-selecting different systems whenever the frequency interval between the frequency bands amounts to about 1 octave. A frequency interval of 1 octave means a doubling of the frequency. For example, a system in the 1 GHz band and a system in the 2 GHz band are separated from each other by 1 octave. However, the 1 GHz range is understood to include all frequency bands that are between 800 and 1000 MHz, while a 2 GHz system comprises all bands between 1700 and 2200 MHz.

The band pairs of other standards, which lie closer to a first band pair, are usually separated from each other in known multi-band devices by means of an additional diplexer circuit and from the rest of the front-end circuit by means of an active switch connected in front of the diplexer circuit, in order to protect the respective receiver from the transmitted signal strength in the first-mentioned signal path, in particular with overlap of the transmission range of a band pair with the reception range of another band pair.

The increase in the number of frequency bands to be included in a mobile radio usually requires the development of a new chip set. The chip set can consist of one or more HF ICs and is suitable for signal processing (e.g. transmitted signal production, modulation/demodulation, mixing and amplification/power amplification) of the appropriate number of frequency bands.

SUMMARY

This application describes a front-end circuit for a communication device, which is designed for multi-band and/or multi-mode operation. This front-end circuit has signal paths running in parallel, connected to a switch on the antenna side, with a filter for a transmission system, with mixed FDD/TDD operation or pure TDD operation provided in each signal path. At least two of the signal paths, which are preferably reception paths, are combined on the output side into an output signal path, in an impedance neutral manner. Impedance neutral means that output impedance matching is provided in at least one of the signal paths or on the output side in a parallel branch, which compensates the capacitive load of a signal path in its pass band via the other signal path or signal paths which is/are parallel therewith. An impedance neutral interconnection of two signal paths can, e.g., occur via a shunt inductance or a strip line located in one of the signal paths.

The front-end circuit described herein is entirely located in one element or a module, which is connectable on the input side with a shared antenna via an antenna connector and on the output side with an HF-IC or several HF-ICs (chip sets). In an embodiment, the element with the front-end circuit comprises a diplexer on the side of the antenna connector, which diplexer has a low-pass filter and a high-pass filter and which, e.g., passively separates 1 GHz and 2 GHz signals from each other. A further separation of (adjacent) frequency band pairs, as well as the separation of the transmitted and received signals of a frequency band (for pure TDD) or of a frequency band pair (for mixed TDD/FDD processes), occurs via an HF switch containing active circuit elements.

In comparison with known front-end circuits, the front-end circuit described herein has a particularly good isolation of signal paths in predetermined blocked frequency ranges, while further processing of the signals received from different frequency bands in a shared output signal path is possible at the same time. Existing chip sets can thus be used, even with an increase in the number of frequency bands employed by mobile radio devices. Combining the signal paths furthermore provides a particularly space-saving solution for the interface between the front-end circuit and the attached chip set.

The front-end circuit described herein provides the necessary uncoupling of the signal paths, in particular reception and transmission paths, from each other, even with an overlap between different frequency bands.

Another embodiment includes a front-end circuit for a finished communication device with a multi-mode or multi-band/multi-mode transmission system. The front-end circuit has parallel signal paths which are connected to a switch located on the input side, with a filter located in each signal path. An antenna connector is provided on the input side. A diplexer is connected in front of or behind the switch. One of the signal paths is associated with a first mobile radio system with Frequency Division Multiple Access (FDMA) multiplex processes and Frequency Division Duplex (FDD) processes designed for continuous wave transmission. This signal path contains a duplexer, which has a receiver element and a transmitter element located behind the switch. At least two of the signal paths that are not identical with said signal path are associated with a second mobile radio system with Time Division Multiple Access (TDMA) multiplex and Time Division Duplex (TDD) processes. In accordance with another embodiment, a signal path can also be associated with a mobile radio system with a mixed TDD/FDD process. All of the aforesaid front-end circuit components are integrated in a module.

The integration of all components of the front-end circuit in a module makes it possible to achieve very stable transmission properties of the circuit, which has only been conditionally possible with known multi-mode and multi-band/multi-mode communication devices.

In a further embodiment, the front-end circuit has parallel signal paths, which are connected to an input, with an impedance transforming network located on the input side and a filter on the output side of each signal path. An antenna connector is located on the input side, with the antenna connection being switchable between a direct connection with an antenna or a connection via a partial antenna-side circuit. A parallel branch is connected to at least one of the signal paths between the impedance transforming network and the filter, in which parallel branch a switch is provided to block this signal path in a blocked frequency range.

The signal paths are preferably mutually independent reception paths of a front-end circuit. The blocked frequency range can for example be an overlapping range between the reception range of a first frequency band and the transmission range of a second frequency band.

In comparison with previously known functional modules of front-end circuits, this embodiment has the advantage that the impedance transforming network can be configured in a particularly space-saving manner by locating the switch in the signal path instead of locating it on the input side in a shared input path as described below in greater detail.

In the following, the embodiments of the front end circuit are described in greater detail based on example embodiments and the corresponding figures. FIGS. 1 to 11 show complete or subsectional views of the embodiments.

DESCRIPTION OF THE DRAWINGS

FIGS. 4b, 4c each show a subsectional view of an example design of the receiving element of the circuit shown in FIG. 4a.

FIG. 5b shows a subsectional view of an example design of the receiver part of the circuit shown in FIG. 5a.

FIG. 6 shows a known circuit with two signal paths and a pin diode switch connected in front.

FIG. 7 shows a circuit with two signal paths and a pin diode switch integrated in a signal path.

DETAILED DESCRIPTION

Figure 1:
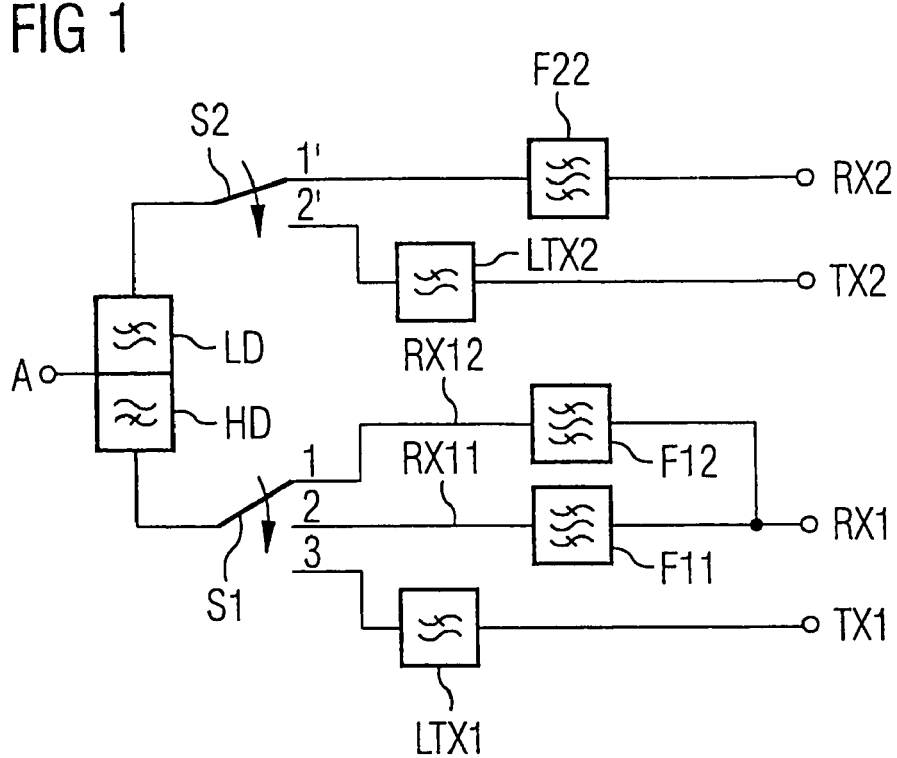
FIG. 1 shows a circuit for a triple band transmission system, which is configurable with a dual band chip set.

FIG. 1 shows a circuit for a triple band system (e.g. EGSM/DCS/PCS), which is configurable with a dual band chip set. Electrical signals are transmitted via an antenna connected to the antenna connector A. A frequency shunt (diplexer), which in this embodiment includes a high-pass filter HD and a low-pass filter LD, is attached to the antenna connector. The filters HD and LD separate the signals differing by approximately 1 octave, for example on the one hand EGSM signals and on the other hand DCS and PCS signals, or the respective frequency bands.

An HF switch S1, S2 is connected behind each of the filters HD and LD. Via the switches S1, S2, the signal paths TX1 (in this case a transmission path, e.g., for transmitting in the DCS and PCS frequency band), RX11 and RX12 (in this case reception paths to receive in the DCS or PCS frequency band) can be alternatively connected, in pure TDD or mixed TDD/FDD processes, with the antenna diplexer and furthermore with the antenna. A transmission filter LTX1 suitable for transmitting in two or more bands is located in the transmission path TX1. In switch position 3 of the switch S1, the signal path TX1 is connected with the high-pass filter HD of the antenna diplexer via the low-pass filter LTX1. The reception path RX11 with the band pass filter F11 located therein is connected to the high-pass filter HD of the antenna diplexer via the switch position 2 of the switch S1 and the reception path RX12 is connected with the reception filter F12 located therein via the switch position 1. In switch position 2', the switch S2 connects the low-pass filter LD of the antenna diplexer alternatively with the transmission path TX2, with a transmission filter LTX2 located therein, and in switch position 1' with the reception path RX2, with a reception filter F2 located therein. The signal paths TX2 and RX2 can, e.g., be designed for signal transmission in the EGSM frequency band.

The signal paths, which are separated from each other frequency-wise by a diplexer, can in principle be used for simultaneous signal transmission in corresponding frequency bands. On the other hand, the active switches switch, in different positions, between different signal paths, so that simultaneous signal transmission over a shared antenna is not possible.

Figure 2:
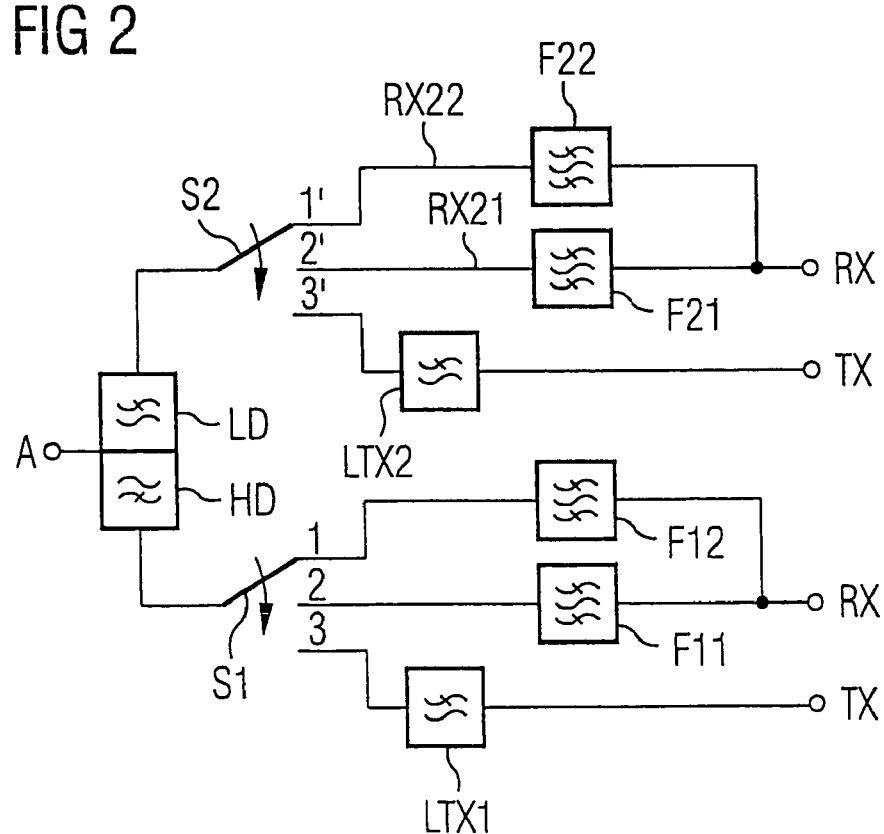
FIG. 2 shows a circuit for a quadruple band transmission system, which is configurable with a dual band chip set.

The signal paths RX11, RX12 are combined at the output, in an impedance neutral manner, into a common reception path RX1, so that the reception filters F11 and F12 do not influence each other in the pass band. It is also possible for more than only two reception paths to be combined in an impedance neutral manner on the output side, with their impedances being matched in the pass band, e.g., by an impedance matching network. It is possible to locate the impedance matching network in at least one of the reception paths RX11 RX12 or RX1 or also in a parallel branch attached to RX1. A further possibility includes integrating several filters, (e.g., as shown in FIG. 2, the filters F21 and F22 including the impedance matching elements) in a module.

The circuit shown in FIG. 1 represents a triple band front-end circuit. The combination of reception paths (in this case, the reception paths RX12 and RX12) makes it possible to connect this circuit with a dual band chip set. This reduces the number of signal processing circuit elements and, therefore, saves space and reduces energy consumption for current supplies to the amplifiers.

The transmission filters LTX1, LTX2 are designed as low-pass filters in order to separate the transmitted signal from unwanted harmonics. In particular, in the transmission path, a low-pass filter has the advantage that it can operate as a band-pass filter or duplexer with lower input damping. The reception filters F11, F12 and F2 are preferably designed as band-pass filters, which have at least the bandwidth needed for the corresponding reception band.

The transmission and reception filters can be of any arbitrary filter technology, and various filtering technologies can also be used within the circuit. The circuit is, for example, configurable with surface wave filters, ceramic microwave filters, FBAR filters (FBAR=Thin Film Bulk Acoustic Wave Resonator), strip line filter, chip LC filters or with a combination of these filter technologies.

The FBAR based filters have a particularly low insertion loss and a high power compatibility at a small size. Such filters are therefore particularly suitable for integration in a front-end module.

Any switches which can readily switch a nearby high frequency signal at the speed required for the time slots (e.g., a switching time of <5 μs) are applicable as HF switches S1, S2. The switches S1, S2 can, e.g., be pin diodes or they can alternatively be configured as MEMS (microelectromechanical system) or GaAs switches.

To function, the diode switches need a current of up to 10 mA, which principally affects the maximum speaking time on the mobile telephone negatively because of the battery power necessary for this, but, through the use of suitable circuit topologies, this power consumption predominantly occurs only in transmission mode. Alternatively usable GaAs switches have the advantage that they are voltage controlled switches, which are not switched by a current but rather by an electrical voltage and thus have extremely low power consumption.

It is possible to integrate the whole front-end circuit in one module. In this case, passive circuit elements, e.g., inductances, capacitors and/or line sections can be formed in metallized layers of a multi-layer support substrate. The diplexers, which are usually constructed with passive components, can also be integrated in the support substrate. The support substrate comprises several dielectric layers, preferably of low temperature cofired ceramics, located between the metallized layers. The diodes, filters, possibly active circuit elements, or partially passive circuit elements as well can be configured as discrete elements and assembled to the surface of the support substrate.

The switches S1, S2, the low-pass filters LTX1, LTX2 located in transmission paths, the band-pass filters F21, F22 located in reception paths, and the antenna diplexers (LD, HD) are preferably designed as discrete elements. It is also possible that these components, e.g., antenna diplexers and switches, combine several switches and/or several filters in one discrete element. It is also possible to design the individual filters as chip LC filters and to integrate them directly in the dielectric layers of a ceramic substrate, e.g., in the support substrate used for the module. The passive circuit elements, e.g., the filters LTX1, LTX2 and the antenna diplexers LD, HD can alternatively be integrated in the support substrate.

The discrete elements can be electrically and mechanically connected with the support substrate by a surface assembly method (e.g., wire bonding, surface mounted device, flip chip, bare die assembly).

The reception or transmission paths named in this description can generally also represent signal paths for signal or data communication.

FIG. 2 shows a further embodiment of a circuit. In this case, two essentially identical signal paths are separated by an antenna diplexer. In the switch positions 1', 2', 3', the switch S2 switches between the paths RX22 (GSM850 reception path), RX21 (EGSM reception path), and TX2 (GSM850/EGSM transmission path). A reception path RX21, which is, for example, designed for the GSM850 band, contains a reception filter F21. Another reception path RX22, which is for example designed for the EGSM band, contains a reception filter F22. The signal paths RX21 and RX22 are interconnected at the output in an impedance neutral manner and constitute a shared signal path RX2. Correspondingly, in the switch positions 1, 2, 3, the switch S1 switches between the signal paths RX11 (DCS reception path), RX12 (PCS reception path) and TX1 (DCS/PCS transmission path). The signal paths RX11 and RX12 are interconnected at the output in an impedance neutral manner and constitute a shared signal path RX1.

It is possible that the signal paths RX11, RX12, RX21, RX22, which are designed as reception paths, are associated with different mobile radio systems (e.g. GSM/UMTS), so that, depending on the mode of operation, transmission signals from several mobile radio systems (e.g. DCS/UMTS transmission signals) can be conveyed via one of the signal paths TX1 and TX2 designed as transmission paths.

It is, in particular, possible to combine several reception paths, which are associated with different mobile radio systems, if the frequency bands are not far apart from each other (e.g. PCS at 1900 MHz and UMTS at 2000 MHz).

The circuit shown in FIG. 2 represents a quadruple band front-end circuit for GSM850/EGSM/DCS/PCS bands of the GSM system. Combining of reception paths as described herein allows this circuit to be interconnected with a dual band chip set.

Figure 3:
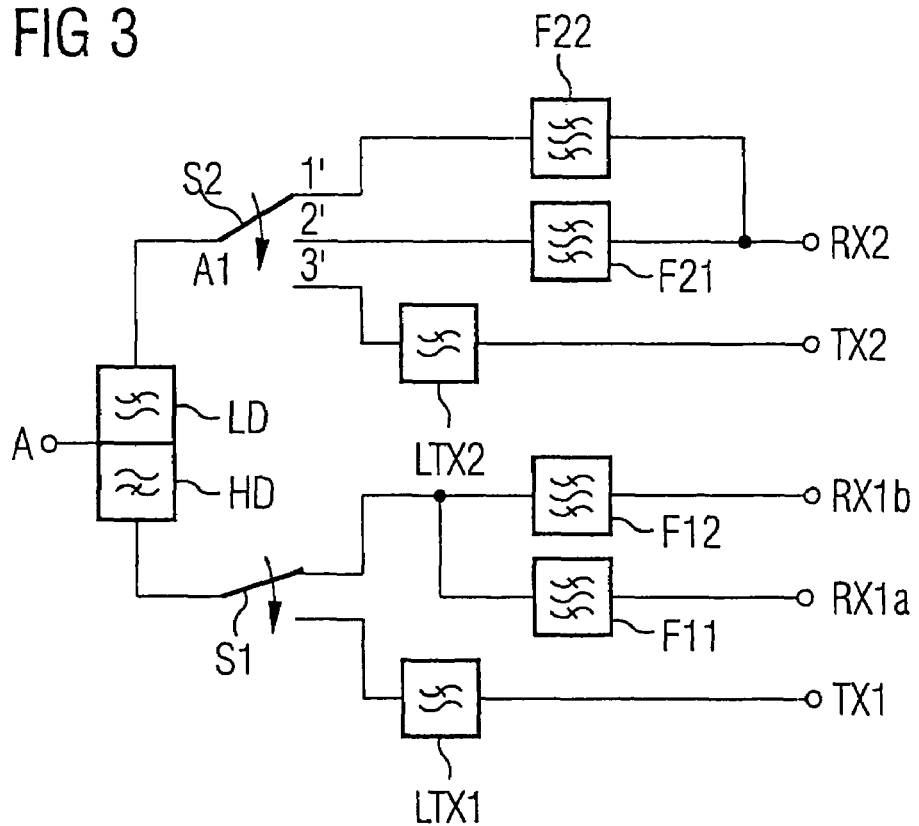
FIGS. 3, 4a each show a circuit for a quadruple band transmission system, which is configurable with a triple band chip set.

In the embodiment shown in FIG. 3, the switch S1 has only two switch positions and switches between the (shared DCS/PCS) transmission path TX1 and the reception paths RX1a (e.g. DCS) and RX1b (e.g. PCS) which are combined on the input side. In the embodiment according to FIG. 2, the switch S2 is connected with the signal paths RX2 and TX2, like the switch S2. This quadruple band circuit can be interconnected with a triple band chip set.

The filters F11, F12 located in the reception paths RX1b, RX1b together constitute a frequency shunt for the passive isolation of two frequency bands of reception signals arriving from the high-pass filters HD. The switching of the switch S 1 is described later in connection with FIGS. 6 to 8.

The splitting of the signal from the antenna side into the paths RX1a, RX1b occurs in the pass band of a filter via the blocking effect of the filter in this frequency range of the parallel signal path.

Figure 4A:
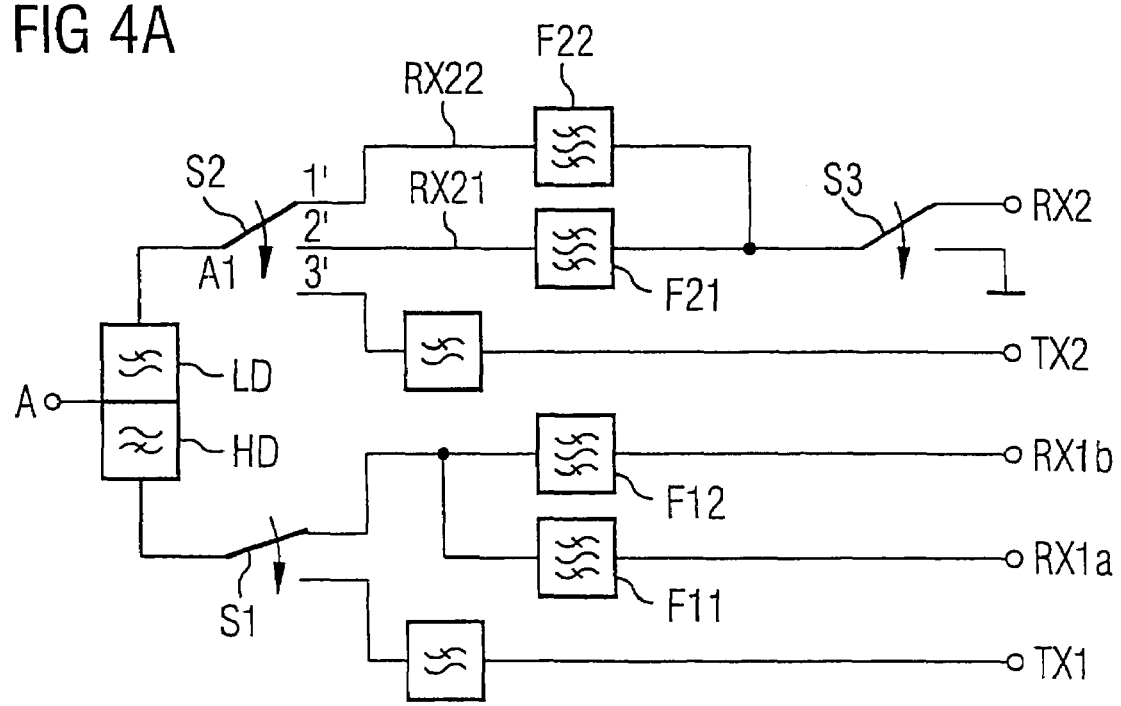

The circuit shown in FIG. 4a differs from that of FIG. 3 in that a change-over switch S3 is located in the signal path RX2, which switch, e.g., short circuits the reception paths RX21, RX22 to ground in the transmission mode associated with the corresponding frequency band in order to further improve the TX/RX isolation in the transmission mode, in particular with overlap between the reception range of a frequency band with the reception band of an adjacent frequency band.

Figure 4B:
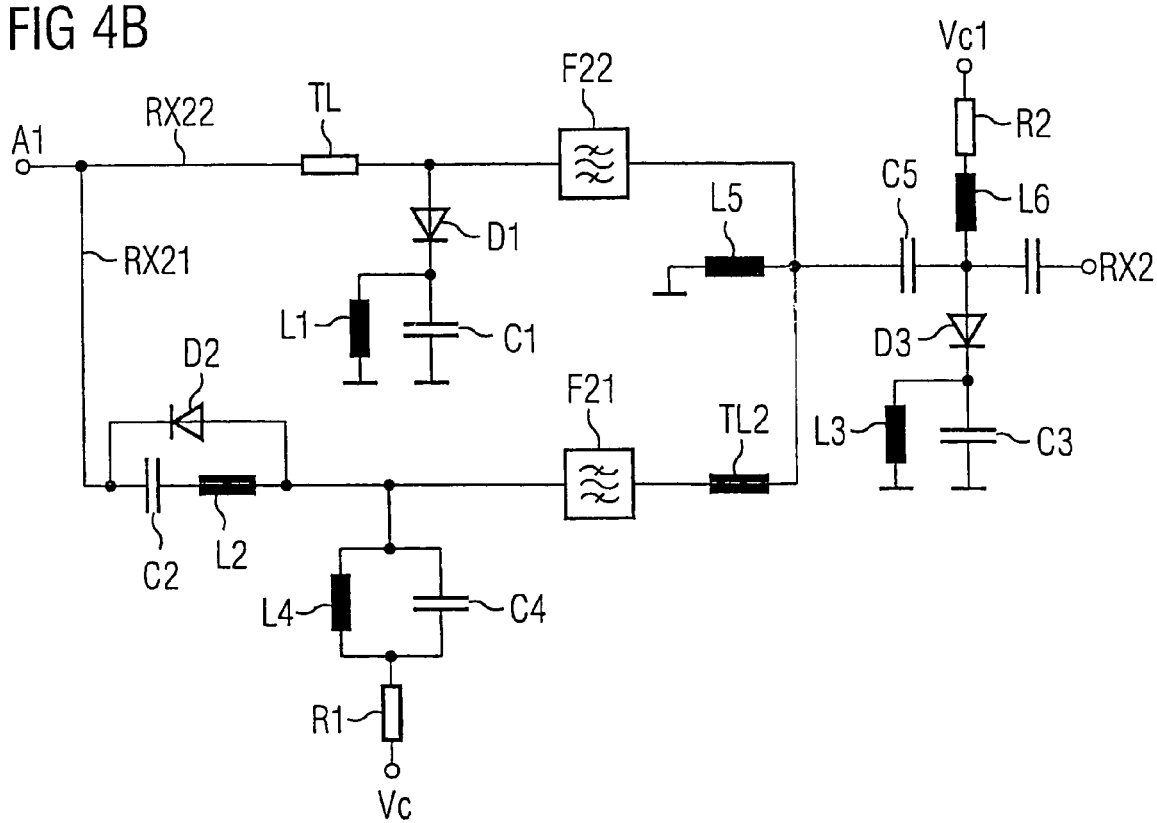

An embodiment of the circuit shown in FIG. 4a is shown in FIG. 4b as a subsectional schematic between the point A1 (antenna connector) and the reception path RX2. The corresponding part of the switch S2 is, in this case, implemented with diodes D1 and D2 in combination with resonant circuits formed by the elements C1, L1 and C2, L2. The inductance L1 connected in series with the diode D1 serves to close the diode D1 when a control voltage is applied to the latter while simultaneously blocking the HF signal.

The switch S3 comprises the diode D3 and the elements L3, C3. In transmission mode, a control voltage Vc1 is applied to the diode D3. The lead inductance of the element D3 and the capacitance resulting from the parallel connection of L3 and C3 together constitute a series resonant circuit, whose resonance frequency corresponds to the corresponding transmission frequency. The elements L6 and R2 serve the purpose of HF decoupling of the direct current path or respectively setting the direct current operating point needed for the diodes. In this transmission mode, the diode D1 is advantageously also simultaneously closed in order to protect the reception filter F22 against a high power transmission signal. The short-circuit to ground in front of the reception filter F22 is preferably transformed to an open end at the point A1 by means of a delay line TL, preferably a $\lambda/4$ strip line. The delay line TL can however be replaced by an equivalent circuit which accomplishes the aforesaid impedance transformation.

To protect the reception filter F21, the diode D2 is in the switched off state in all operating conditions except for the reception operation in the signal path RX21 and, along with L2 and C2, constitutes a blocking circuit in the transmission operation via the path TX2 as well as in the reception operation via the path RX22. In reception mode in the frequency band corresponding to the reception path RX21 (e.g. GSM850), a control voltage Vc is applied to the diode D2 via the resonant circuit formed by the elements L4, C4 and R1. The diode D1 is then also closed and the reception path RX22 in the pass band of the reception path RX21 is thus closed. The resonant circuit formed by the elements C4 and L4 servers the purpose of HF uncoupling of the direct current control path. R1 serves the purpose of adjusting the direct current operating point.

The inductance L5 serves the purpose of adapting the output impedance of the filter F22 in the pass band of the filter F21. A strip line TL2 as well as the inductance L5 serves to adapt the output impedance of F21 in the pass band of the filter F22. The line TL2 produces an angular phase shift of the signal exiting from the filter F21. The length of the line TL2 is selected so that the output impedance of the filter F21 in the pass band of the filter F22 is largely tuned to an open circuit operation.

Figure 4C:
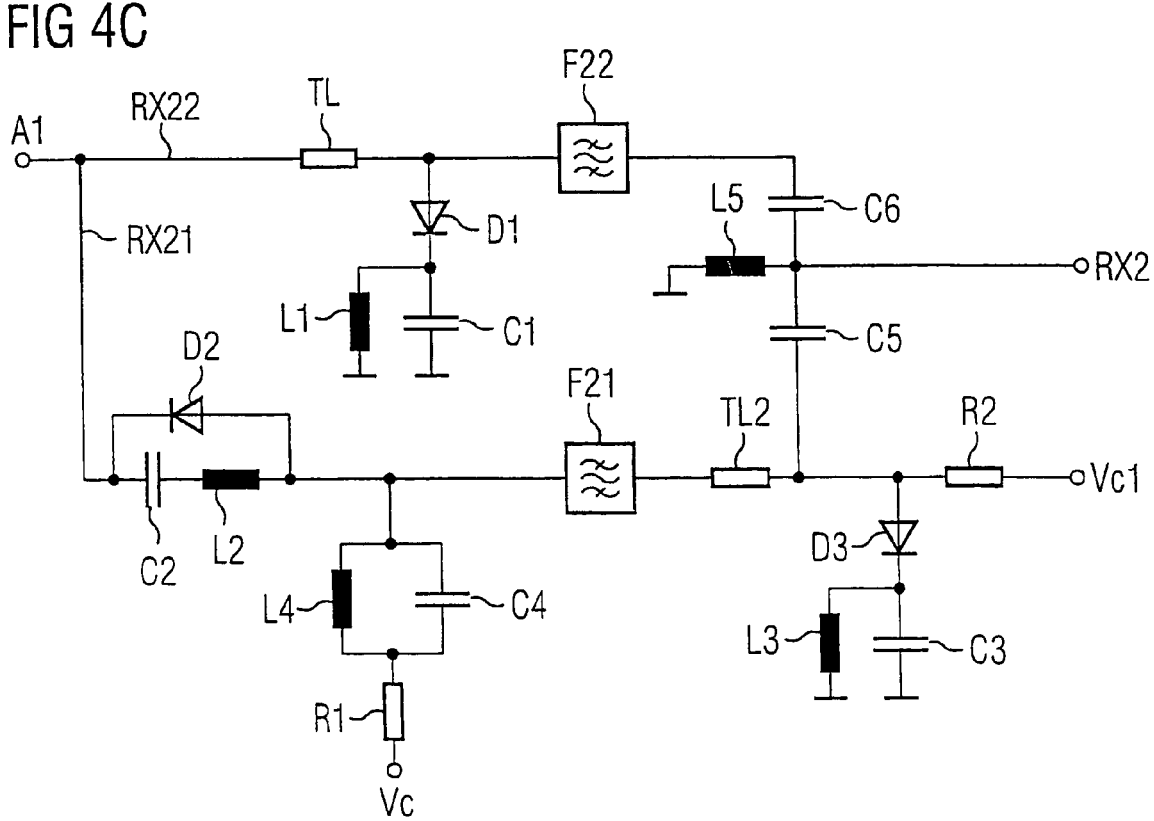

The embodiment shown in FIG. 4c suggests that the switch comprising the diode D3 and the elements L3 and C3 can alternatively be located in a signal path (in this case the reception path RX21). It is then possible that the reception path RX21 has a partial frequency range which overlaps with that of the path TX2, while the path RX22 does not have a partial frequency range overlapping with other bands. DC decoupling of the signal path RX22 on switching the diode D3 with the control voltage Vc1 is achieved via the capacitor C5. The line TL2 along with the capacitor C5 constitutes an adaptive network at the output of the filter F21. The inductance L5 and the capacitor C6 also adapt to the output impedance of the signal paths.

Figure 5A:
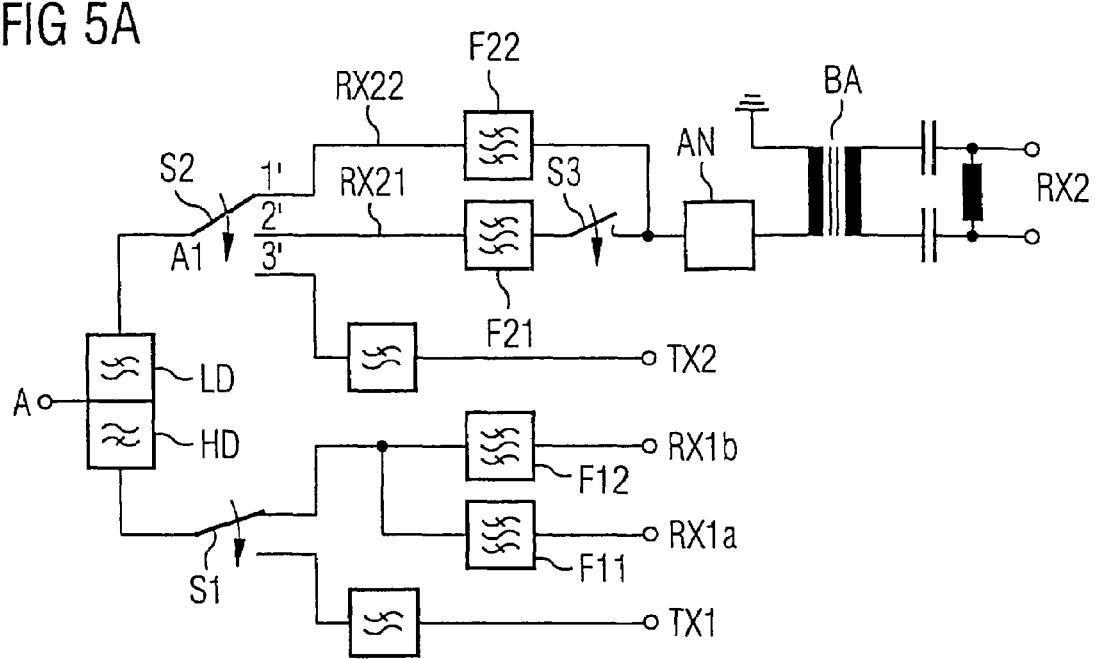
FIG. 5a shows a circuit for a quadruple band transmission system with a symmetrically configured RX output, which is configurable with a triple band chip set.

FIG. 5a shows another advantageous embodiment, in which a switch S3 is in the reception path RX21 for increasing isolation between the reception paths RX21, RX22. The shared signal path RX2 is, in this case, configured symmetrically, with an adaptive network AN being located in the shared signal path immediately after the combination of the signal paths RX21, RX22, which network serves the purpose of adapting the output impedance and contains LC elements connected in series or in parallel or line segments in the signal path. A balun BA, which performs signal balancing, is connected behind the adaptive network AN. The balun BA can simultaneously perform an impedance transformation, e.g. from 50 ohms to 150 ohms. The balun can be followed by other elements, e.g., series capacitors which serve the purpose of DC decoupling the output signal.

Figure 5B:
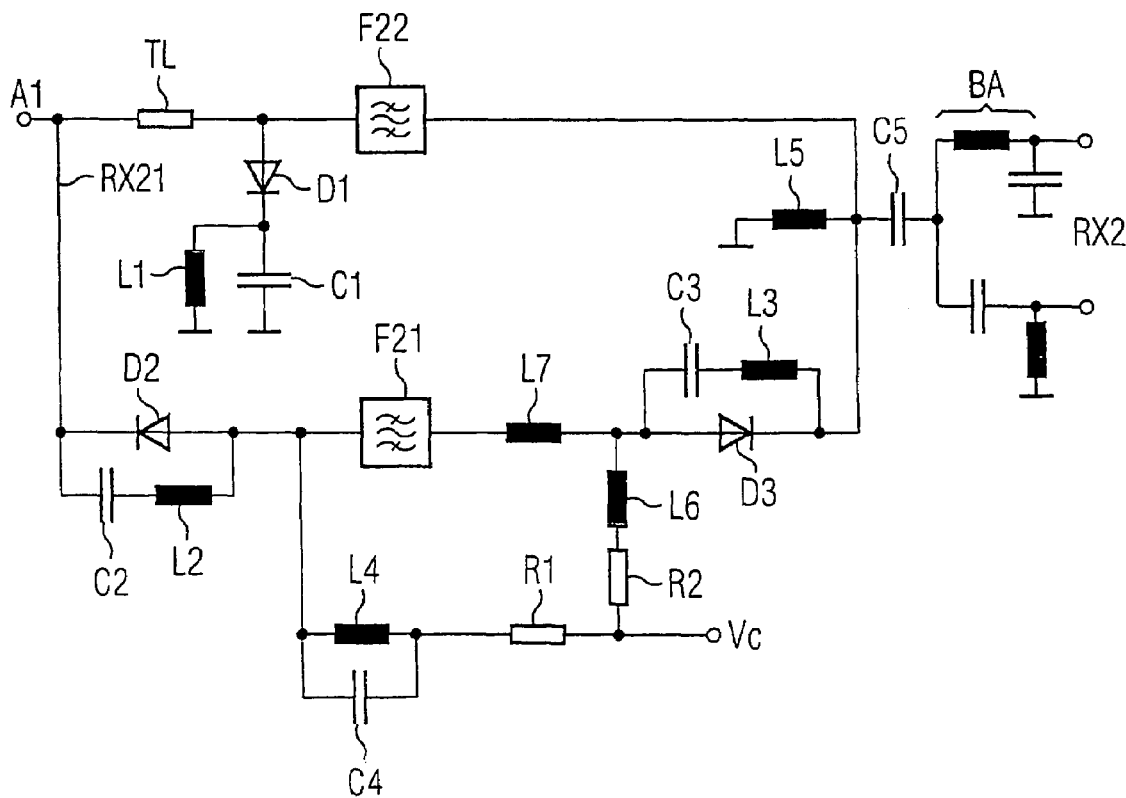

FIG. 5b shows a subsection of the embodiment of the circuit in accordance with FIG. 5a. As previously described in FIG. 4b, the connection of the switch S2 with the paths RX21 and RX22 is achieved by elements D1, C1, L1 or respectively D2, L2, C2. The mode of operation of the line TL is also explained in FIG. 4b. The control voltage for the diodes D2 and D1 is applied via the control voltage Vc, the resistor R1 and the inductance L4 and simultaneously closes the diodes D2 and D1, where the diode D1 produces a short-circuit to ground and blocks the filter F22 in the pass band of the filter F21. The elements L4 and C4 form a resonance rejection, which, e.g., blocks in the pass band of the filter F21. The control voltage for the diode D3 is controlled with the resistor R2. The inductance L6 blocks the signal path for the RF signal. The diode D3 only allows the signal to pass if the control voltage Vc is applied in the reception mode of the reception path RX21 (pass band of the filter F21).

The inductance L7 located at the output of the filter F21, together with the elements D3, C3 and L3, constitutes an adaptive network at the output of the signal path RX21, which provides a high output impedance of the signal path RX21 or respectively of the filter F21 in the pass band of the filter F22 (in particular in the operating mode of the reception path RX22 with the diode D3 switched off). The inductance L5 is located in a parallel branch in the output signal path and corresponds to the adaptive network AN. It simultaneously serves the purpose of a direct current (DC) return path to ground on applying the control voltage Vc to the diode D3. The capacitor C5 located in front of the balun BA decouples the DC part of the output signal. The balun BA is formed by two LC components connected in parallel.

Figure 5C:
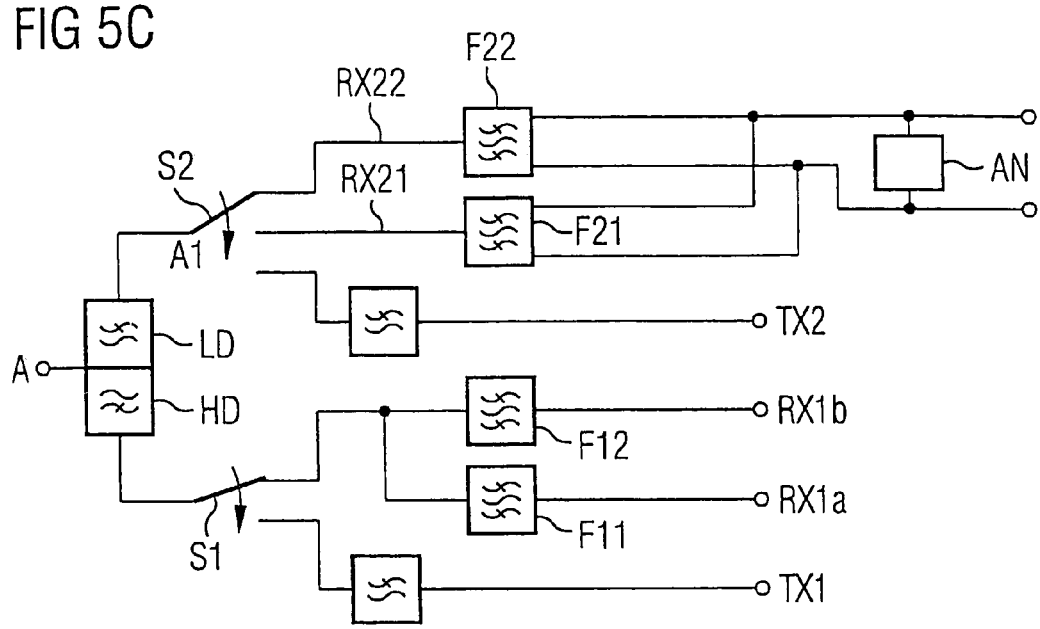
FIGS. 5c, 5d, 5e each show another circuit for a quadruple band transmission system with a symmetrically configured RX output, which circuit is configurable with a triple band chip set.
Figure 5D:
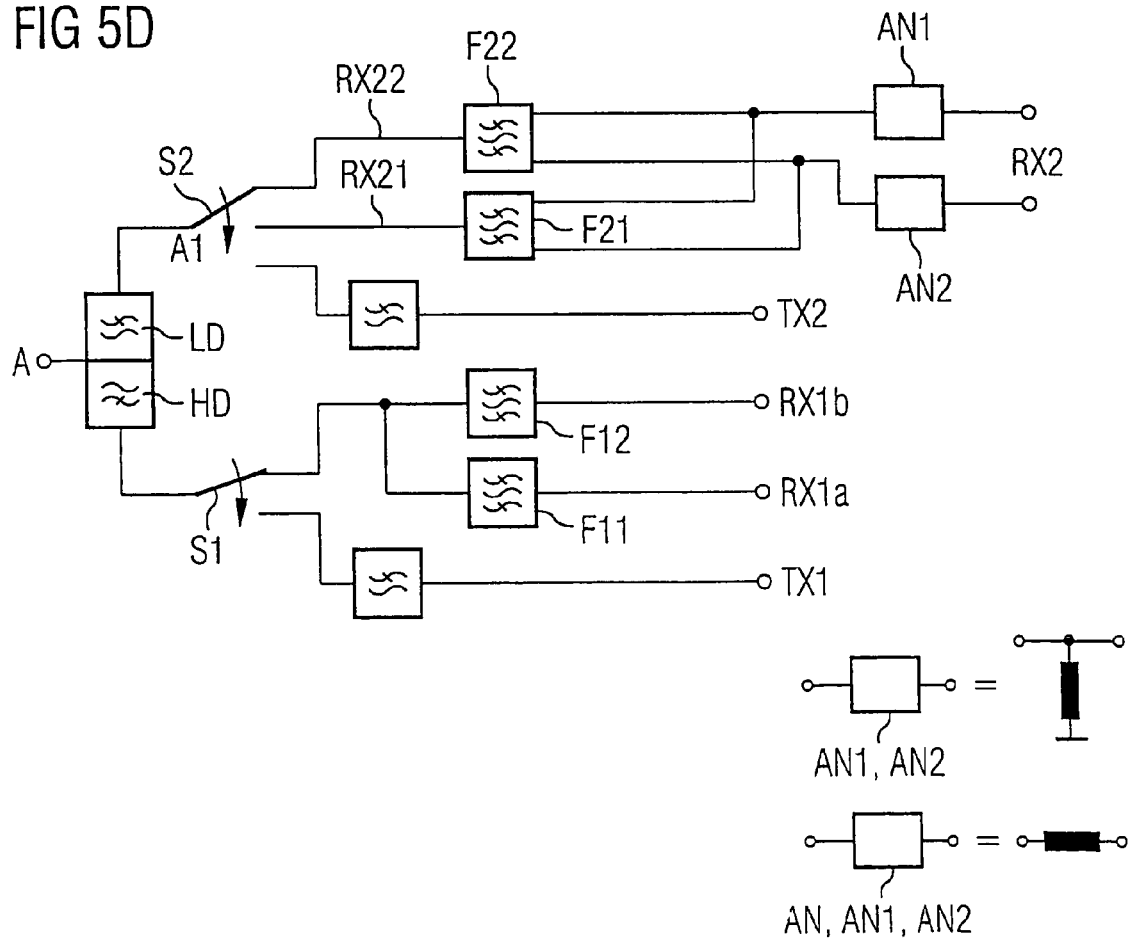

FIGS. 5c, 5d each show a further circuit for a quadruple band system with a symmetric RX output RX2, which is combinable with a triple band chip set. In this variant, the filters F21, F22 also fulfill a balun function in addition to the actual filtering function. By this means signal balancing occurs before the paths are combined.

FIG. 5c indicates that the adaptive network AN can be located in a parallel branch between the signal lines of the signal path RX2 (differential adaptive network).

In FIG. 5d, the adaptive networks AN1 and AN2 are respectively located in the two signal lines of the signal path RX2. The adaptive networks AN1 and AN2 can each be configured as an adaptive network with respect to ground and can together form a so-called symmetrical adaptive network.

An adaptive network can alternatively also be located in the signal lines symmetrically configured on the output side of the signal paths RX21 and RX22 before these signal paths are combined. Any combination of the possibilities enumerated here is also possible. The bottom of FIG. 5d suggests that the adaptive networks AN1 and/or AN2 can be configured as preferably grounded inductances connected in parallel to a signal line as well that the adaptive networks AN, AN1 and/or AN2 can be connected in series as inductances in a signal line. In place of the inductances shown here, the adaptive networks can contain any interconnection of inductances, capacitors and/or line sections, with symmetrical π or T-members being preferred.

Figure 5E:
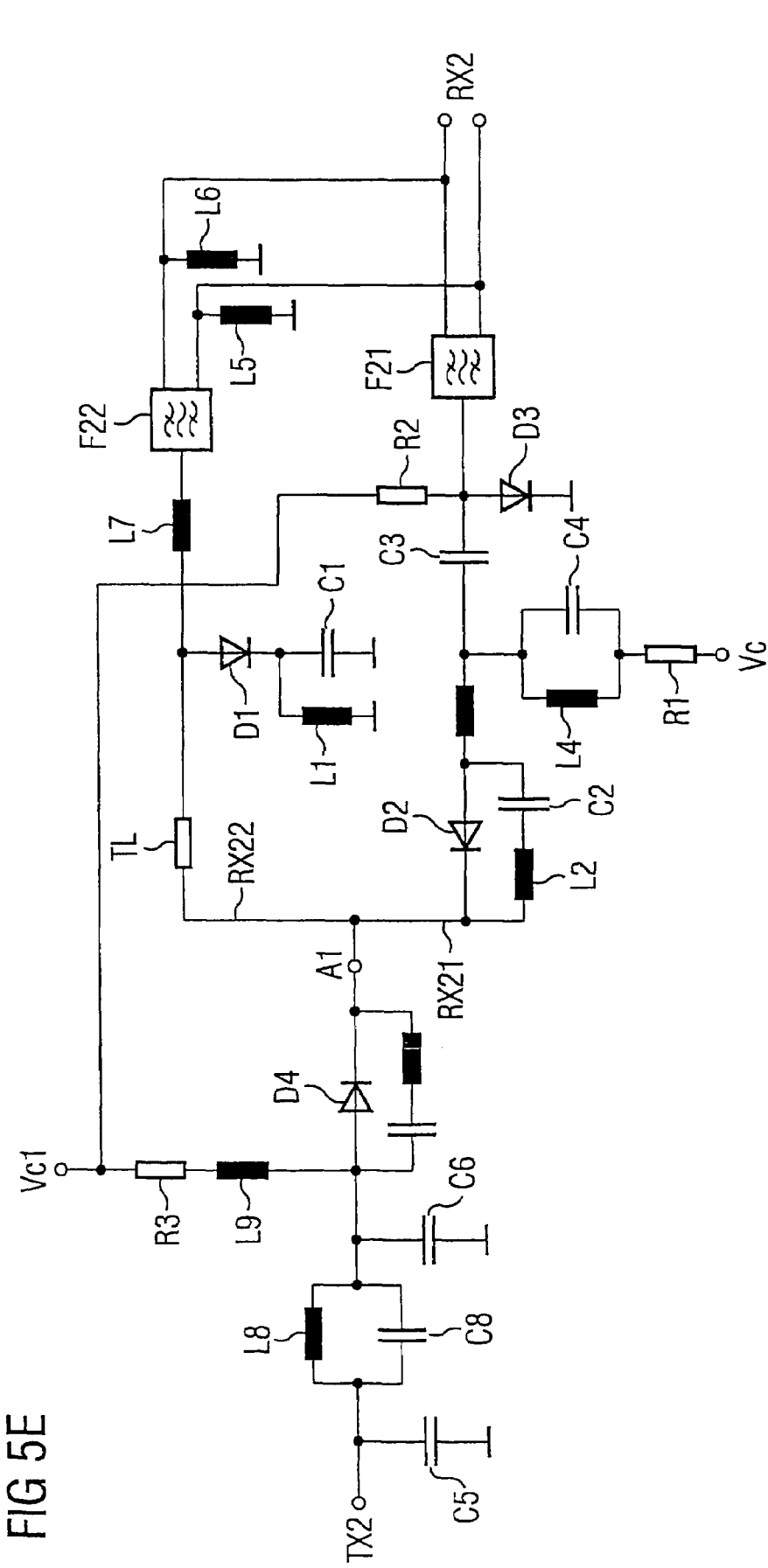

FIG. 5e shows a subsection of a further embodiment. In this embodiment, the transmission path TX2 is also located on the antenna connector A1, in parallel with the reception paths RX21, RX22. In the reception mode, the transmission path TX2 is blocked by the diode D4, which along with the diodes D1 and D2 constitutes a part of the switch S2. In transmission mode, the diode D4 is switched on via the control voltage Vc1 (this corresponds to the position 3' of the switch S2 in FIG. 2). The inductance L9 decouples the DC circuit from the HF signal path TX2. The elements C5, C6, L8 and C8 are a possible embodiment of the low-pass filter LTX2, which serves the purpose of suppressing the harmonics of the transmission signal. The resistance R3 serves the purpose of adjusting the control voltage. The capacitor C3 here serves to, on the one hand, DC decouple the control voltage Vc1 from the diode D2 and, on the other hand, to DC decouple the control voltage Vc from the diode D3.

The inductances L5 and L6 located at the symmetrical end of the signal path RX22 correspond to the adaptive networks AN1 and AN2.

It happens that the frequency bands partially overlap with, for example, the transmission range of a frequency band partially overlapping with the reception range of a neighboring frequency band (such as e.g. the PCS transmission range from 1850 to 1910 MHz and the DC3 reception range from 1805 to 1880 MHz). Since no isolation of the reception filter (located in the DCS reception path) against the transmission power of the other frequency band is, in this case, provided in the overlap range, the corresponding reception path (DCS) must be actively blocked in the critical overlap range. The transmission range at 1710 to 1785 MHz for the DCS transmission signal must also be configured as a blocked frequency range for the two reception paths. Overlap ranges are also present in the transmission of GSM (850 MHz) and EGSM signals via a shared signal path. Unwanted interferences can likewise occur with multi-band transmission systems which are e.g. supposed to separate signals from GSM, UMTS and WLAN from each other.

FIG. 6 shows a known possibility for blocking two or more reception paths, e.g., according to the configuration of the reception paths RX1a, RX1b in FIG. 3, that are combined on the input side at the point B in a defined frequency range, e.g., in the transmission range.

FIG. 6 shows two parallel signal paths C and D that are combined on the input side at the point B, with a filter F21, F22 connected on the output side and an impedance transformation network IT1, IT2 on the input side of each signal path. The impedance transformation networks IT1, IT2 each serve to transform the input impedance of the attached filter for the pass band of the other filter into a high impedance range and to block the corresponding signal path in this frequency range. The impedance transformation networks comprise a suitable combination of inductances, capacitors and line sections.

Before the partitioning of the signal paths at the point B, an (active) switch is provided in a parallel branch comprised of a diode D1, a capacitor C1, an inductance L1 and the impedance transformation network IT3. On applying a control voltage to the diode D1 (e.g., in the transmission range) the latter is closed and a short-circuit to ground is thereby produced at the point B, which blocks the signal paths C, D and which is transformed to an open end in the corresponding blocked frequency range at the point A1 by the impedance transformation network IT3.

The impedance transformation network IT3 is preferably configured as a $\lambda/4$ line, which signifies a line length of $\lambda/4$ at the transmitter frequency. The impedance transformation network IT1 usually comprises a line, whose length, as measured in wavelengths, somewhat exceeds $\lambda/4$. Therefore the function block shown in FIG. 6 has the disadvantage that the total line length per signal path amounts to at least $\lambda/2$, which is associated with corresponding high signal losses and a high space requirement.

An alternative solution includes placing or branching off a parallel branch at the point B1, B2 with such a switch in one signal path (the signal path D in FIG. 7) or in several signal paths C, D (FIG. 8), in each case in front of the filter F22, F21 which is to be blocked.

In the transmission mode, a control voltage is applied to the diode D1 in the parallel branch or to both diodes D1, D2 simultaneously (in FIG. 8), where a short circuit to ground occurs at the point B1 or B2 as well. An inductance L1 is connected in series with the pin diode D1, which together with the pin diode D1 constitutes a direct current path. A capacitor C1 is connected in parallel to the inductance L1 and in series with the pin diode D1. In case of a short-circuit, the closed diode D1, which essentially operates as a small inductance once the control voltage is applied, and the capacitor C1 form a series circuit or an absorber circuit, whose resonant frequency corresponds to at least one frequency in the blocked frequency range (e.g. the transmission frequency), with the absorber circuit being particularly conductive. The impedance transformation networks IT1, IT2 serve the purpose of transforming the short circuit into an open end at the point A1.

Figure 8:
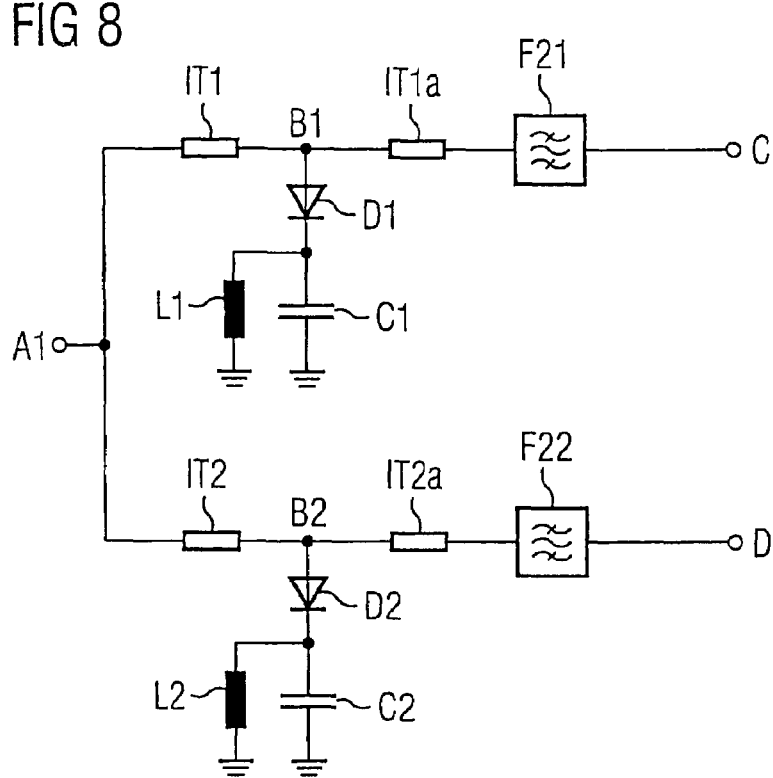
FIG. 8 shows a circuit with two signal paths and pin diode switches integrated therein.

In the circuit presented in FIG. 8, an additional adaptive network IT1a, IT1b is located between the parallel branches and the filters F21, F22. The input impedance of the filters F21, F22 is then accommodated. The adaptive networks can, e.g., be a series or a shunt inductance or any combination of LC elements connected in front of the filter F21 or F22. The mode of operation of the elements L2 and C2 in FIG. 8 essentially corresponds to that of the elements L1 and C1.

The signal paths C and D are each preferably configured as reception paths.

The closed diode D1 can also, e.g., inhibit the filter F21 in the pass band of the filter F22. The closed diode D2 can analogously inhibit the filter F22 in the pass band of the filter F21. In a preferred variant, both diodes are switched on in a blocked frequency range (in particular in the transmission range of one of the frequency bands), in order to protect the filters F21, F22, e.g., from transmission signals.

In the configuration of the switch in accordance with FIGS. 7 or 8, the impedance transformation network IT3 located on the input side as shown in FIG. 6 is omitted. Therefore the overall line length per signal path is at most half as long in comparison with that in FIG. 6, which represents a particularly space-saving and low-loss solution.

The placement of the switch S1 in the parallel branch of a signal path instead of its placement on the input side before the signal paths are separated presupposes that the filter in the parallel signal path along with the impedance transformation network located therein provides good isolation in blocked ranges.

The circuits shown in FIGS. 6 to 8 can also be constructed of discrete elements based on different technologies located on a shared plate.

Figure 9:
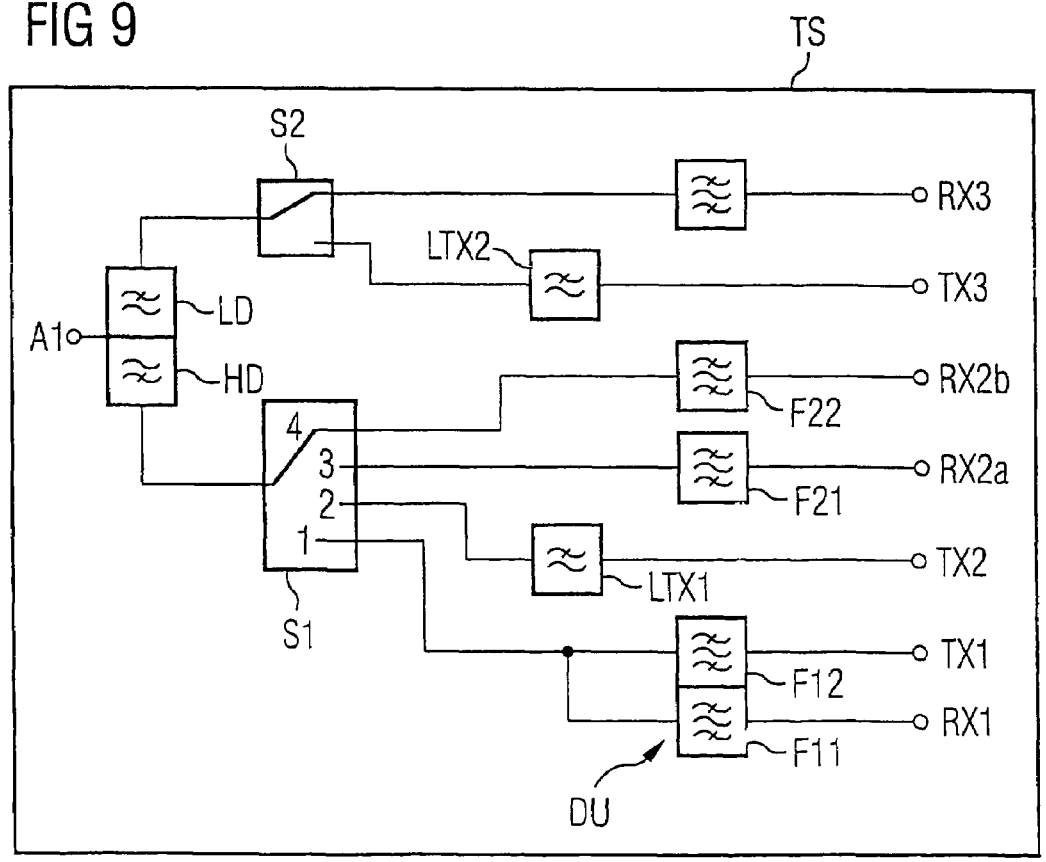
FIGS. 9, 10a, 10b each show a circuit for a quadruple band/dual mode transmission system.

FIG. 9 shows a front-ends circuit for a quadruple band/dual mode system, which is, e.g., operated in a 3-band GSM (EGSM, DCS, PC) and UMTS mode.

The diplexer located on the antenna side and previously described in FIG. 1 separates the signals arriving from the antenna according to frequency.

The signal path TX1/RX1 is associated with a first mobile radio system with Frequency Division Multiple Access multiplex processes and Frequency Division Duplex processes, preferably with a system transmitting in Continuous Wave Mode, e.g. a UMTS system (2000 MHz). The first mobile radio system is in particular configured for Continuous Wave transmission. This signal path contains a duplexer DU, which has a transmission and a reception element, with the transmission element and the reception element being connected behind the switch S1 in this embodiment. The transmission and the reception elements of the duplexer respectively contain a band-pass filter F12 and F11, with the frequency bands of these filters being located next to each other, free of overlap.

The signal paths TX2, RX2a, RX2b, RX3 and TX3 are associated with a second mobile radio system with a Time Division Multiple Access Multiplex Process and a Time Division Duplex Process, e.g. a GSM system with 3 frequency bands. The signal path TX2 then serves as a transmission path for both a first (PCS, 1900 MHz) and a second (DCS, 1800 MHz) frequency band. The signal path TX3 serves as a transmission path for a third (EGSM, 900 MHz) frequency band. The signal paths RX2a, RX2b and RX3 are designed as receiving paths for the first, second or third frequency band.

The diplexer separates the signals of the third frequency band of the second mobile radio system (EGSM signals) from signals in other frequency bands. The switch S2, which is connected behind the low-pass filter LD, performs TDD between the signal paths RX3 and TX3. Depending on the operating mode, the switch S1 interconnects the signal paths TX1, RX1 of the first mobile radio system (UMTS paths) or the signal paths TX2, RX2a, RX2b of the second mobile radio system (GSM paths) with the high-pass filter HD of the antenna diplexer. In one of the GSM operating modes, the switch S1 switches between the transmission path TX2 and the corresponding reception path RX2a or RX2b.

In the embodiments described herein, all of the circuit components are assembled on the support substrate TS.

A simultaneous data transmission via different mobile radio systems is possible in principle. The circuit shown in FIG. 9 allows for simultaneous data transmission in the information channels that are combined via the diplexer and that are separated from each other in a frequency-wise passive manner (e.g., on the one hand in the information channel TX3/RX3 of the FDD/TDD system and on the other hand in the information channel TX1/RX1 of the FDD system transmitting in Continuous Wave Mode).

It is furthermore possible to run a parallel signal transmission in the front-end module in the adjacent frequency bands, which belong to a different mobile radio system, e.g., on the one hand UMTS and on the other hand GSM 1800 (or GSM 1900), by an appropriate setting of the final device (e.g. with time slots).

Figure 10A:
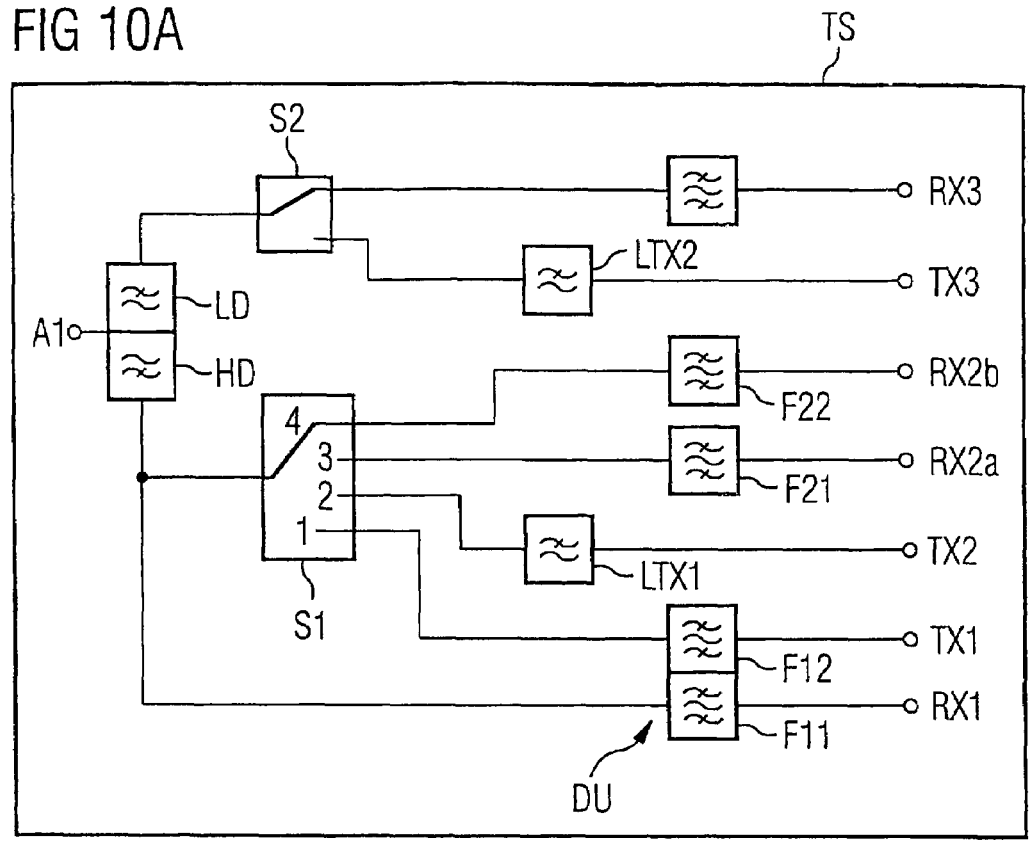

A further possibility for achieving a multi-band/dual mode system is shown in FIG. 10a. In contrast to FIG. 9, the signal path RX1 of the first mobile radio system is not located behind the switch S1, but rather between the diplexer and the switch S1. This embodiment has the advantage that monitoring of the signal received via the first mobile radio system is also possible in the operating mode of the second mobile radio system. It is possible to "knock" with a call arriving over the first mobile radio system during a conversation over the second mobile radio system. The user can then decide whether he accepts this call. If he decides to switch over, the switch S1 is shifted to the position 1, whereby transmission via the first mobile radio system is enabled. It is also possible, by an appropriate setting of the final device, to process the data of the first mobile radio system (UMTS) and of one of the adjacent frequency bands of the second mobile radio system (GSM 1800, GSM 1900) in parallel, in which case the switch S1 interconnects two corresponding transmission paths with the antenna connection A1 in alternating time slots.

Figure 10B:
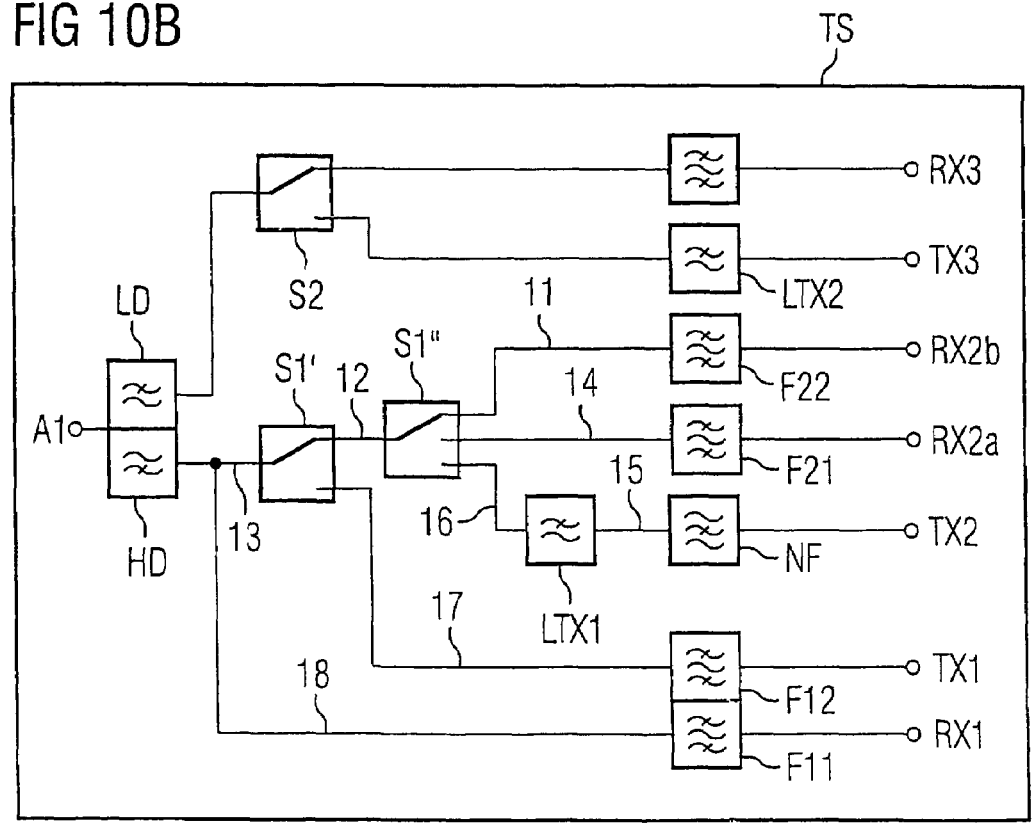

FIG. 10b shows an advantageous embodiment as described in FIG. 10b, wherein two switches S1' and S1" instead of the switch S1 are used to isolate the signals in the signal paths TX1, RX1, TX2, RX2a and RX2b. The switch S1' has two switch positions and, depending on the setting of the final device, connects the antenna connector A1 or respectively the antenna either with the transmission path TX1 of the first mobile radio system or—depending on the switch position of the switch S1"—with one of the signal paths TX2, RX2a and RX2b. The switch S1" accordingly has three switch positions.

The paths TX3, RX3 are configured as shown in FIG. 9.

A notch filter NF is connected on the output side (behind the low-pass filter LTX1) in the signal path TX2, which filter can, e.g., be used to selectively suppress the harmonics of the transmission signal. The notch filter can be configured on a chip located on the support substrate TS.

It is possible to configure the filters named in this document (F11 to F22, LTX1, LTX2, NF) together or individually on a chip and to assemble the chip to the support substrate TS and connect it therewith. Such a configuration of the elements is called a front-end module.

Because of high transmission power, which is conveyed via the transmission paths TX1, TX2, good suppression of the signals transmitted in the pass bands must be ensured.

In order to cleanly separate the different signals that are to be transmitted in adjacent frequency bands, fixed phase relationships in the respective signal paths (in this case, TX1, RX1, TX2, RX2a and RX2b) are of particular importance, in particular in the path from the high-pass filter HD of the diplexer to the corresponding filters on the output side of the signal path (F11 to F22, LTX2, NF). It is therefore desirable for the phase relationships in one front-end circuit to not be affected externally and to be independent of the nature of the finished device.

The phase relationships are primarily determined by the lengths of the transmission lines, which interconnect the circuit components HD and S1', S1" and TX1, S1' and S1", S" and LTX1, S1" and RX2a as well as S1" and RX2b. In FIG. 10b, the corresponding line segments are given the reference symbols 11 to 18.

Fixed phase relationships are achieved between the transmission lines 11 to 18 by integrating the corresponding line segments in the aforesaid front-end module. The transmission lines 11 to 18 are preferably located in at least one metallization layer of the support substrate TS. The line segments are then preferably concealed inside the support substrate.

The integration of the transmission lines in the front-end module has the advantage that the nature of the finished device in which the module is employed does not affect the electrical properties of the front-end circuit, in particular the suppression of adjacent answering bands (e.g. GSM 1800, GSM 1900) in the pass band of a selected signal path (e.g. the UMTS reception path RX1).

Figure 11:
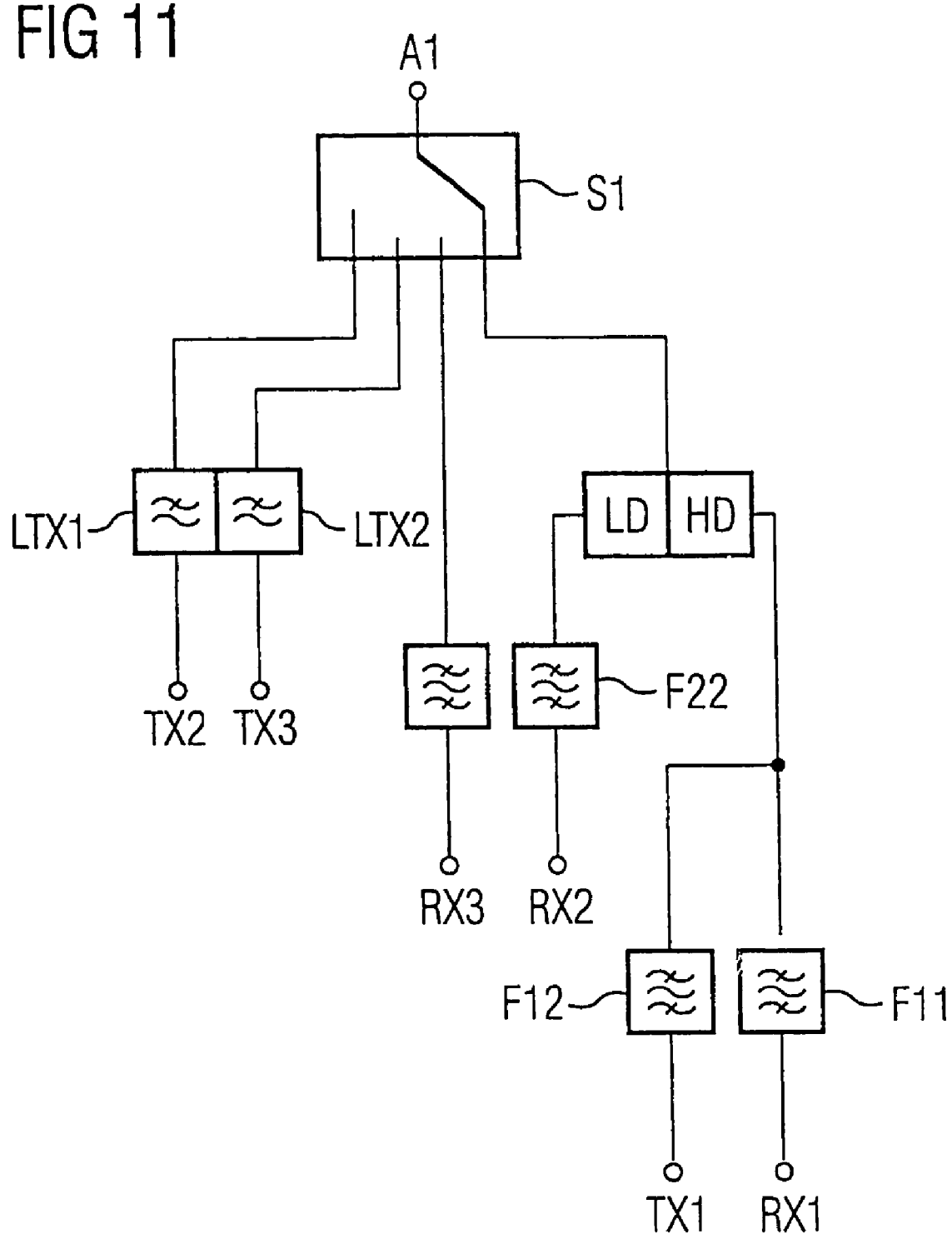
FIG. 11 shows a circuit for a triple band/dual mode transmission system.

FIG. 11 shows a circuit for a triple band/dual mode transmission system. In contrast with the embodiments described above, the switch S1 is, in this case, connected directly to the antenna. The signal paths RX1 and TX1 are associated with a first mobile radio system (UMTS). The filter F11 located in the reception path RX1 and the filter F12 located in the transmission path TX1 preferably constitute a duplexer.

The signal paths RX2, RX3, TX2 and TX3 are associated with a first (RX2/TX2) and a second (RX3/TX3) frequency band of a second mobile radio system (GSM). The first frequency band can e.g. be an EGSM band. The second frequency band can, e.g., be a DCS band. The combined transmission/reception path TX1/RX1 of the first mobile radio system is connected on the input side, in an impedance neutral manner, via the diplexer LD, HD with the reception path RX2 of the second mobile radio system. Since, unlike a switch, the diplexer performs passive signal isolation, transmission by the first mobile radio system and monitoring of the first frequency band of the second system can occur simultaneously.

The diplexer can in principle be omitted if the signal paths are combined, if an impedance neutral interconnection of these signal paths is possible.

It is also possible to integrate several switches and several frequency shunts (diplexers and duplexers) in the front-end circuit.

As mentioned previously, the HF filters and the diplexer can be constructed by different methods and different methods can similarly be employed for the HF switches, the combination switches and the change-over switches. The switches can for example be configured as gallium arsenide FET transistors. It is also possible to configure the switches as PIN diodes with additional transformation lines or other adaptively switched elements which can produce a phase shift. A possible example embodiment would be a λ/4 strip line which is integrated in the support substrate.

Depending on the requirement of the communication device, the outputs of the reception paths can be configured symmetrically or differentially, with the impedance termination of the output as well as that of the antenna connector respectively possibly being 50 Ω. The impedance termination of the output with respect to the antenna connector can also be raised or lowered by means of impedance transformation.

Aside from mobile radio systems, the signal paths can also be associated with arbitrary data transmission systems.

Apart from the implementations presented in the representative embodiments and the corresponding figures, numerous other combinations, which can be obtained by omitting individual components or by a combination of individual components of the described example embodiments, are conceivable.

The invention claimed is:
1. A front-end circuit comprising:
   a first signal path comprising
      a first filter, and
      a first reception path assigned to a first mobile radio system and a first radio frequency band;
   a second signal path comprising
      a second filter, and
      a second reception path assigned to a second mobile radio system and a second radio frequency band;
   a switch having an output connected to inputs of the first and second signal paths;
   an input circuit to provide signals to the switch, the input circuit comprising an antenna connector; and
   a diode circuit to enhance isolation of the first and second signal paths, the diode circuit being arranged in the shared output path, the diode circuit for rejecting signals in at least one rejection band, the diode circuit comprising diodes connected in shunt or in series;
   wherein outputs of the first and second signal paths are connected in an impedance-neutral manner to form a shared output signal path;
   wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths; and wherein the front-end circuit is usable with a multi-band transmission system or multi-band/multi-mode transmission system.

2. The front-end circuit of claim 1, further comprising:
a further switch located in at least one of the first and second signal paths.

3. The front-end circuit of claim 2, wherein the further switch is located in the first signal path between the antenna connector and the first filter; or
wherein the further switch is located in the second signal path between the antenna connector and the second filter.

4. The front-end circuit of claim 1, wherein the at least one rejection band comprises (i) a frequency range in which a receive band of the first signal path overlaps, at least partly, with a transmit band of the second signal path, or (ii) a frequency range in which a receive band of the second signal path overlaps, at least partly, with a transmit band of the first signal path.

5. The front-end circuit of claim 1, wherein all components of the front-end circuit are integrated in a common front-end module.

6. The front-end circuit of claim 1, wherein the impedance-matching circuitry is in the first signal path, the impedance-matching circuitry for making an output impedance of the first signal path be high in a pass band of the second signal path; or
wherein the impedance-matching circuitry is in the second signal path, the output circuitry for making an output impedance of the second signal path be high in a pass band of the first signal path.

7. The front-end circuit of claim 1, further comprising:
output circuitry located in the shared output signal path.

8. A front-end circuit comprising:
a first signal path comprising a first filter;
a second signal path comprising a second filter;
a switch having an output connected to inputs of the first and second signal paths;
an input circuit to provide signals to the switch, the input circuit comprising an antenna connector;
a parallel branch having a first end connected to the output of at least one of the first and second signal paths, and a second end connected to ground; and
output circuitry in the parallel branch;
wherein outputs of the first and second signal paths are connected in an impedance-neutral manner to form a shared output signal path;
wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths; and
wherein the front-end circuit is usable with a multi-band transmission system or multi-band/multi-mode transmission system.

9. The front-end circuit of claim 8,
wherein the output circuitry comprises a further switch, the output circuitry being located in the shared output signal path; and
wherein the further switch is operable to short the first end of the parallel branch to ground.

10. The front-end circuit of claim 8, wherein all components of the front-end circuit are integrated in a common front-end module.

11. The front-end circuit of claim 8, wherein the impedance-matching circuitry is in the first signal path, the impedance-matching circuitry for making an output impedance of the first signal path be high in a pass band of the second signal path; or
wherein the impedance-matching circuitry is in the second signal path, the output circuitry for making an output impedance of the second signal path be high in a pass band of the first signal path.

12. The front-end circuit of claim 8, wherein the output circuitry is located in the shared output signal path.

13. A front-end circuit comprising:
a first signal path comprising a first filter;
a second signal path comprising a second filter;
a switch having an output connected to inputs of the first and second signal paths;
an input circuit to provide signals to the switch, the input circuit comprising an antenna connector; and
a further switch located in at least one of the first and second signal paths;
wherein (i) the further switch is located in the first signal path, the first filter being located between the antenna connector and the further switch, or (ii) wherein the further switch is located in the second signal path, the second filter being located between the antenna connector and the further switch;
wherein outputs of the first and second signal paths are connected in an impedance-neutral manner to form a shared output signal path;
wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths; and
wherein the front-end circuit is usable with a multi-band transmission system or multi-band/multi-mode transmission system.

14. The front-end circuit of claim 13, wherein all components of the front-end circuit are integrated in a common front-end module.

15. The front-end circuit of claim 13, wherein the impedance-matching circuitry is in the first signal path, the impedance-matching circuitry for making an output impedance of the first signal path be high in a pass band of the second signal path; or
wherein the impedance-matching circuitry is in the second signal path, the output circuitry for making an output impedance of the second signal path be high in a pass band of the first signal path.

16. The front-end circuit of claim 13, further comprising:
output circuitry located in the shared output signal path.

17. A front-end circuit comprising:
a first signal path comprising a first filter;
a second signal path comprising a second filter;
a switch having an output connected to inputs of the first and second signal paths;
an input circuit to provide signals to the switch, the input circuit comprising an antenna connector; and
a further switch located in the shared output signal path;
wherein outputs of the first and second signal paths are connected in an impedance-neutral manner to form a shared output signal path;
wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths; and wherein the front-end circuit is usable with a multi-band transmission system or multi-band/multi-mode transmission system.

18. The front-end circuit of claim 17, wherein all components of the front-end circuit are integrated in a common front-end module.

19. The front-end circuit of claim 18, wherein the impedance-matching circuitry is in the first signal path, the impedance-matching circuitry for making an output impedance of the first signal path be high in a pass band of the second signal path; or wherein the impedance-matching circuitry is in the second signal path, the output circuitry for making an output impedance of the second signal path be high in a pass band of the first signal path.

20. The front-end circuit of claim 18, further comprising: output circuitry located in the shared output signal path.

21. A front-end circuit comprising:
a first signal path comprising
a first filter, and
a first reception path assigned to a first mobile radio system and a first radio frequency band;
a second signal path comprising
a second filter, and
a second reception path assigned to a second mobile radio system and a second radio frequency band;
a switch having an output connected to inputs of the first and second signal paths;
an input circuit to provide signals to the switch, the input circuit comprising an antenna connector; and
a diode circuit to enhance isolation of the first and second signal paths, the diode circuit being in at least one of the first reception path and the second reception path, the diode circuit for rejecting signals in at least one rejection band of a signal path, the diode circuit comprising diodes connected in shunt or in series;
wherein outputs of the first and second signal paths are connected in an impedance-neutral manner to form a shared output signal path;
wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths;
wherein the front-end circuit is usable with a multi-band transmission system or multi-band/multi-mode transmission system; and
wherein the diode circuit is between the antenna connector and the filter of the first or second signal paths.

22. The front-end circuit of claim 21, wherein the at least one rejection band comprises (i) a frequency range in which a receive band of the first signal path overlaps, at least partly, with a transmit band of the second signal path, or (ii) a frequency range in which a receive band of the second signal path overlaps, at least partly, with a transmit band of the first signal path.

23. The front-end circuit of claim 21, wherein all components of the front-end circuit are integrated in a common front-end module.

24. The front-end circuit of claim 21, wherein the impedance-matching circuitry is in the first signal path, the impedance-matching circuitry for making an output impedance of the first signal path be high in a pass band of the second signal path; or wherein the impedance-matching circuitry is in the second signal path, the output circuitry for making an output impedance of the second signal path be high in a pass band of the first signal path.

25. The front-end circuit of claim 21, further comprising: output circuitry located in the shared output signal path.

26. A front-end circuit comprising:
a first signal path comprising
a first filter, and
a first reception path assigned to a first mobile radio system and a first radio frequency band;
a second signal path comprising
a second filter, and
a second reception path assigned to a second mobile radio system and a second radio frequency band;
a switch having an output connected to inputs of the first and second signal paths;
an input circuit to provide signals to the switch, the input circuit comprising an antenna connector; and
a diode circuit to enhance isolation of signal paths, the diode circuit being in at least one of the first reception path and the second reception path, the diode circuit for rejecting signals in at least one rejection band of a signal path, the diode circuit comprising diodes connected in shunt or in series;
wherein outputs of the first and second signal paths are connected in an impedance-neutral manner to form a shared output signal path;
wherein (i) the first filter has a high output impedance in a pass band of the second filter or the second filter has a high output impedance in a pass band of the first filter, or (ii) the front-end circuit further comprises impedance-matching circuitry on an output side of the front-end circuit, the impedance-matching circuitry for matching output impedances of the first and second signal paths;
wherein the front-end circuit is usable with a multi-band transmission system or multi-band/multi-mode transmission system; and
wherein the filter of the first or second signal paths is between the antenna connector and the diode circuit.

27. The front-end circuit of claim 26, wherein the at least one rejection band comprises (i) a frequency range in which a receive band of the first signal path overlaps, at least partly, with a transmit band of the second signal path, or (ii) a frequency range in which a receive band of the second signal path overlaps, at least partly, with a transmit band of the first signal path.

28. The front-end circuit of claim 26, wherein all components of the front-end circuit are integrated in a common front-end module.

29. The front-end circuit of claim 26, wherein the impedance-matching circuitry is in the first signal path, the impedance-matching circuitry for making an output impedance of the first signal path be high in a pass band of the second signal path; or wherein the impedance-matching circuitry is in the second signal path, the output circuitry for making an output impedance of the second signal path be high in a pass band of the first signal path.

30. The front-end circuit of claim 26, further comprising: output circuitry located in the shared output signal path.

* * * * *